United States Patent
Yoo et al.

(10) Patent No.: US 9,135,159 B2
(45) Date of Patent: Sep. 15, 2015

(54) MANAGEMENT OF MEMORY POOL IN VIRTUALIZATION ENVIRONMENT

(75) Inventors: Jung-Hyun Yoo, Gunpo-si (KR);
Sung-Min Lee, Suwon-si (KR);
Sang-Bum Suh, Seoul (KR)

(73) Assignee: Samsung Electronics Co., Ltd.,
Suwon-si (KR)

( * ) Notice: Subject to any disclaimer, the term of this patent is extended or adjusted under 35 U.S.C. 154(b) by 1007 days.

(21) Appl. No.: 13/242,398

(22) Filed: Sep. 23, 2011

(65) Prior Publication Data

US 2012/0221765 A1    Aug. 30, 2012

(30) Foreign Application Priority Data

Feb. 24, 2011    (KR) ........................ 10-2011-0016517

(51) Int. Cl.
| | |
|---|---|
| *G06F 13/00* | (2006.01) |
| *G06F 13/28* | (2006.01) |
| *G06F 12/02* | (2006.01) |
| *G06F 9/50* | (2006.01) |

(52) U.S. Cl.
CPC ............ *G06F 12/023* (2013.01); *G06F 9/5016* (2013.01); *G06F 9/5077* (2013.01); *G06F 2209/5021* (2013.01); *G06F 2212/152* (2013.01)

(58) Field of Classification Search
CPC ..... G06F 9/5016; G06F 9/5077; G06F 12/023
USPC ......................... 711/116, E12.002; 718/104
See application file for complete search history.

(56) References Cited

U.S. PATENT DOCUMENTS

| | | | | |
|---|---|---|---|---|
| 7,143,413 | B2* | 11/2006 | McCarthy et al. ............ | 718/104 |
| 7,979,857 | B2* | 7/2011 | Esfahany et al. ................. | 718/1 |
| 2010/0169536 | A1 | 7/2010 | Shedel et al. | |
| 2011/0138147 | A1* | 6/2011 | Knowles et al. ............. | 711/170 |

OTHER PUBLICATIONS

Magenheimer, Dan, et al., "Transcendent Memory and Linux," Oracle Corp., (9 pages, in English).
Waldspurger, Carl A., "Memory Resource Management in VMware ESX Server," Proc. Fifth Symposium on Operating Systems Design and Implementation (OSDI '02), Dec. 2002, (14 pages, in English).

* cited by examiner

*Primary Examiner* — Edward Dudek, Jr.
(74) *Attorney, Agent, or Firm* — NSIP Law

(57) ABSTRACT

A virtualization apparatus is provided. The virtualization apparatus includes a plurality of virtual machines configured to have priority levels, a memory pool configured to be shared between the plurality of virtual machines and store part of data stored in a system memory of each of the plurality of virtual machines, and a memory pool manager configured to process a memory allocation request or a data storage request regarding the memory pool in consideration of the priority levels of the plurality of virtual machines, a guaranteed memory size for each of the plurality of virtual machines, and a size of memory that can be allocated to each of the plurality of virtual machines.

14 Claims, 8 Drawing Sheets

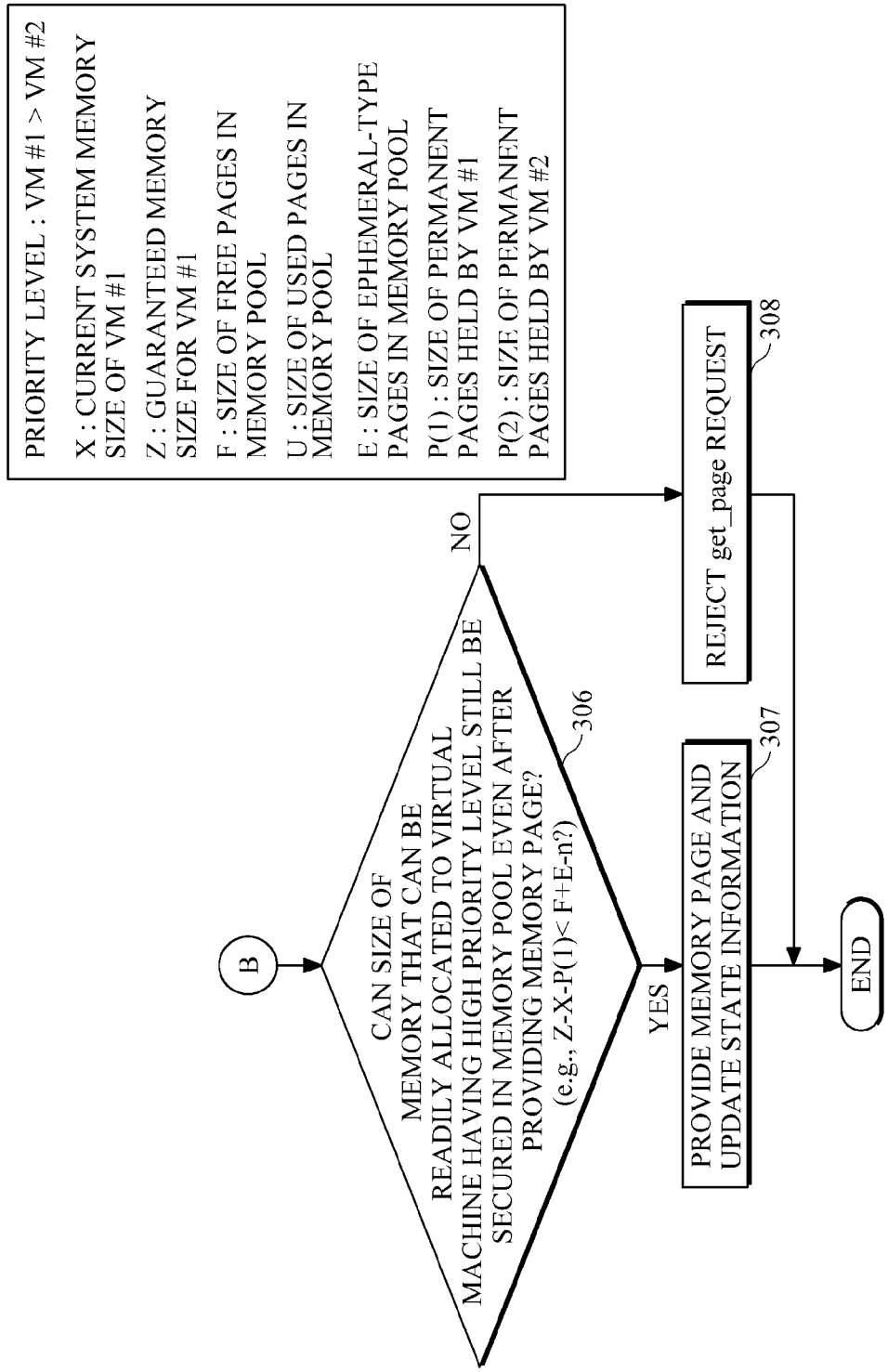

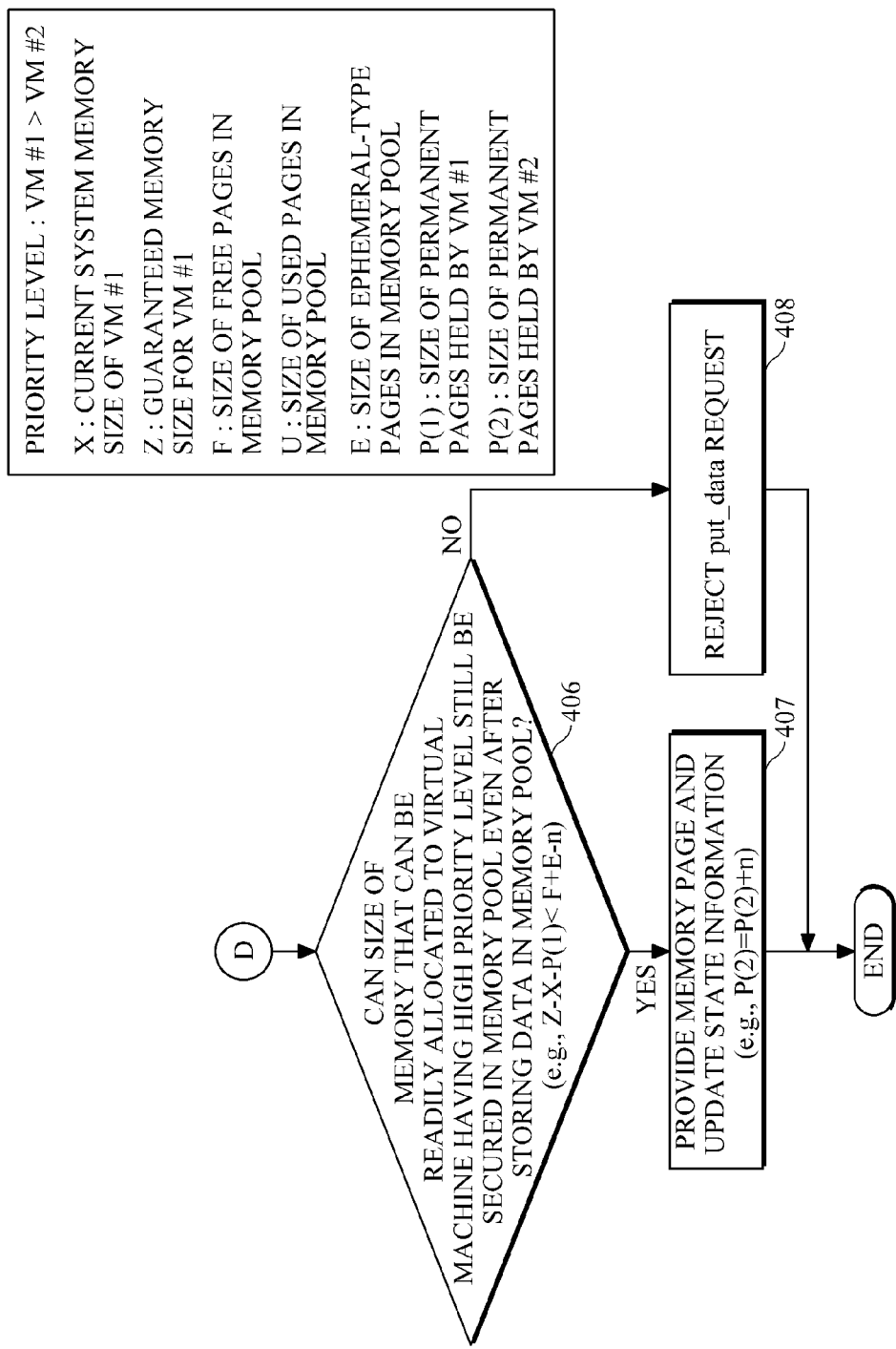

MANAGEMENT OF MEMORY POOL IN VIRTUALIZATION ENVIRONMENT

CROSS-REFERENCE TO RELATED APPLICATION(S)

This application claims the benefit under 35 U.S.C. §119(a) of Korean Patent Application No. 10-2011-0016517, filed on Feb. 24, 2011, in the Korean Intellectual Property Office, the entire disclosure of which is incorporated herein by reference for all purposes.

BACKGROUND

1. Field

The following description relates to management of memory pool in virtualization environment.

2. Description of the Related Art

System virtualization is a technique of creating a plurality of virtual machines that act like physical machines in an effort to allow various operating systems (OSs) to operate as virtual machines on a single physical hardware device.

Different OSs or virtual machines may operate independently in a virtualization environment based on system virtualization. Accordingly, applications can be seamlessly executed without the need to determine on what OS or virtual machine they operate.

Resources (for example, a system memory) may be allocated to each virtual machine through system virtualization. A conventional virtualization system may manage memory space based on the efficiency of the use of the whole memory space. In other words, the conventional virtualization system fails to take into account performance or memory workload of each virtual machine and may result in a decrease in the operating speed of each virtual machine. For example, in a case in which a particular virtual machine is required to allocate a memory space of at least 100 MB in order to maintain its performance, the size of memory available for allocation to the particular virtual machine may be less than 100 MB in order to improve the efficiency of the use of the whole memory space.

SUMMARY

In one general aspect, a virtualization apparatus is provided. The virtualization apparatus includes a plurality of virtual machines configured to have priority levels, a memory pool configured to be shared between the plurality of virtual machines and store part of data stored in a system memory of each of the plurality of virtual machines, and a memory pool manager configured to process a memory allocation request or a data storage request regarding the memory pool in consideration of the priority levels of the plurality of virtual machines, a guaranteed memory size for each of the plurality of virtual machines, and a size of memory that can be allocated to each of the plurality of virtual machines.

The memory pool manager may receive the memory allocation request from a first virtual machine, which is one of the plurality of virtual machines, may determine whether the first virtual machine is a virtual machine with a highest priority level, and in response to the first virtual machine being the virtual machine with the highest priority level, may provide a page of the memory pool to an extent that the guaranteed memory size for the first virtual machine can be secured.

In response to the first virtual machine not being the virtual machine with the highest priority level, the memory pool manager may provide a page of the memory pool to an extent that a size of memory that can be readily allocated to each virtual machine having a higher priority level than the first virtual machine can be secured.

In response to the data storage request being received from a second virtual machine, which is one of the plurality of virtual machines, the memory pool manager may determine whether the second virtual machine is a virtual machine with a highest priority level, and, in response to the second virtual machine being the virtual machine with the highest priority level, the memory pool manager may store data in the memory pool to an extent that the guaranteed memory size for the second virtual machine can be secured.

In response to the second virtual machine not being the virtual machine with the highest priority level, the memory pool manager may store data in the memory pool to an extent that a size of memory that can be readily allocated to each virtual machine having a higher priority level than the second virtual machine can be secured.

The memory pool may include a plurality of pages and the memory pool manager may classify the plurality of pages into free pages and used pages, may classify the used pages into ephemeral-type pages and persistent-type pages, and may process the memory allocation request or the data storage request based on the free pages and the ephemeral-type pages.

The size of memory that can be readily allocated to each of the plurality of virtual machines may be defined by subtracting a sum of a current system memory size of a corresponding virtual machine and a size of ephemeral-type pages used by the corresponding virtual machine from a guaranteed memory size for the corresponding virtual machine.

In another aspect, a memory pool management apparatus for use in a virtualization environment is provided. The memory pool management apparatus includes a reception unit configured to receive a memory allocation request regarding a memory pool, which stores part of data stored in a system memory of each of a plurality of virtual machines having priority levels, from a first virtual machine, which is one of the plurality of virtual machines, and a processing unit configured to determine whether the first virtual machine is a virtual machine with a highest priority level and, in response to the first virtual machine being the virtual machine with the highest priority level, provide a page of the memory pool to an extent that a guaranteed memory size for the first virtual machine can be secured.

In response to the first virtual machine not being the virtual machine with the highest priority level, the processing unit may provide a page of the memory pool to an extent that a size of memory that can be readily allocated to each virtual machine having a higher priority level than the first virtual machine can be secured.

In yet another aspect, a memory pool management apparatus for use in a virtualization environment is provided. The memory pool management apparatus includes a reception unit configured to receive a memory storage request regarding a memory pool, which stores part of data stored in a system memory of each of a plurality of virtual machines having priority levels, from a second virtual machine, which is one of the plurality of virtual machines, and a processing unit configured to determine whether the second virtual machine is a virtual machine with a highest priority level and, in response to the second virtual machine being the virtual machine with the highest priority level, store data in the memory pool to an extent that a guaranteed memory size for the second virtual machine can be secured.

In response to the second virtual machine not being the virtual machine with the highest priority level, the processing unit may store data in the memory pool to an extent that a size of memory that can be readily allocated to each virtual machine having a higher priority level than the second virtual machine can be secured.

In yet another aspect, a memory pool management method for use in a virtual environment is provided. The memory pool management method includes receiving a memory allocation request regarding a memory pool, which stores part of data stored in a system memory of each of a plurality of virtual machines having priority levels, from a first virtual machine, which is one of the plurality of virtual machines, and determining whether the first virtual machine is a virtual machine with a highest priority level and, in response to the first virtual machine being the virtual machine with the highest priority level, providing a page of the memory pool to an extent that a guaranteed memory size for the first virtual machine can be secured.

In response to the first virtual machine not being the virtual machine with the highest priority level, the providing of the page of the memory pool may include providing the page of the memory pool to an extent that a size of memory that can be readily allocated to each virtual machine having a higher priority level than the first virtual machine can be secured.

In yet another aspect, a memory pool management method for use in a virtualization environment is provided. The memory pool management method includes receiving a data storage request regarding a memory pool, which stores part of data stored in a system memory of each of a plurality of virtual machines having priority levels, from a first virtual machine, which is one of the plurality of virtual machines, and determining whether the first virtual machine is a virtual machine with a highest priority level and, in response to the first virtual machine being the virtual machine with the highest priority level, storing data in the memory pool to an extent that a guaranteed memory size for the first virtual machine can be secured.

In response to the first virtual machine not being the virtual machine with the highest priority level, the storing of the data may include storing the data in the memory pool to an extent that a size of memory that can be readily allocated to each virtual machine having a higher priority level than the first virtual machine can be secured.

In yet another aspect, a memory pool management method for use in a virtual environment is provided. The memory pool management method includes receiving a memory allocation request regarding a memory pool, which stores a part of data stored in a system memory of each of a plurality of virtual machines having priority levels, from one of the plurality of virtual machines, in response to the one virtual machine being the virtual machine with the highest priority level, providing a page of the memory pool to an extent that a guaranteed memory size for the one virtual machine can be secured, and in response to the one virtual machine being the virtual machine with a lower priority than the highest priority level, rejecting the memory allocation request.

The providing operation may include updating state information of the current system memory.

In yet another aspect, a memory pool management method for use in a virtualization environment is provided. The memory pool management method includes receiving a data storage request regarding a memory pool, which stores a part of data stored in a system memory of each of a plurality of virtual machines having priority levels, from one of the plurality of virtual machine, in response to the one virtual machine being the virtual machine with the highest priority level, storing data in the memory pool to an extent that a guaranteed memory size for the one virtual machine can be secured, and in response to the one virtual machine being the virtual machine with a lower priority than the highest priority level, rejecting the data storage request.

The providing operation may include updating state information of the current system memory. Other features and aspects may be apparent from the following detailed description, the drawings, and the claims.

BRIEF DESCRIPTION OF THE DRAWINGS

FIGS. 3A through 3C are flowcharts illustrating an example of a memory pool management method.

FIGS. 4A through 4C are flowcharts illustrating another example of a memory pool management method.

Figure 1:
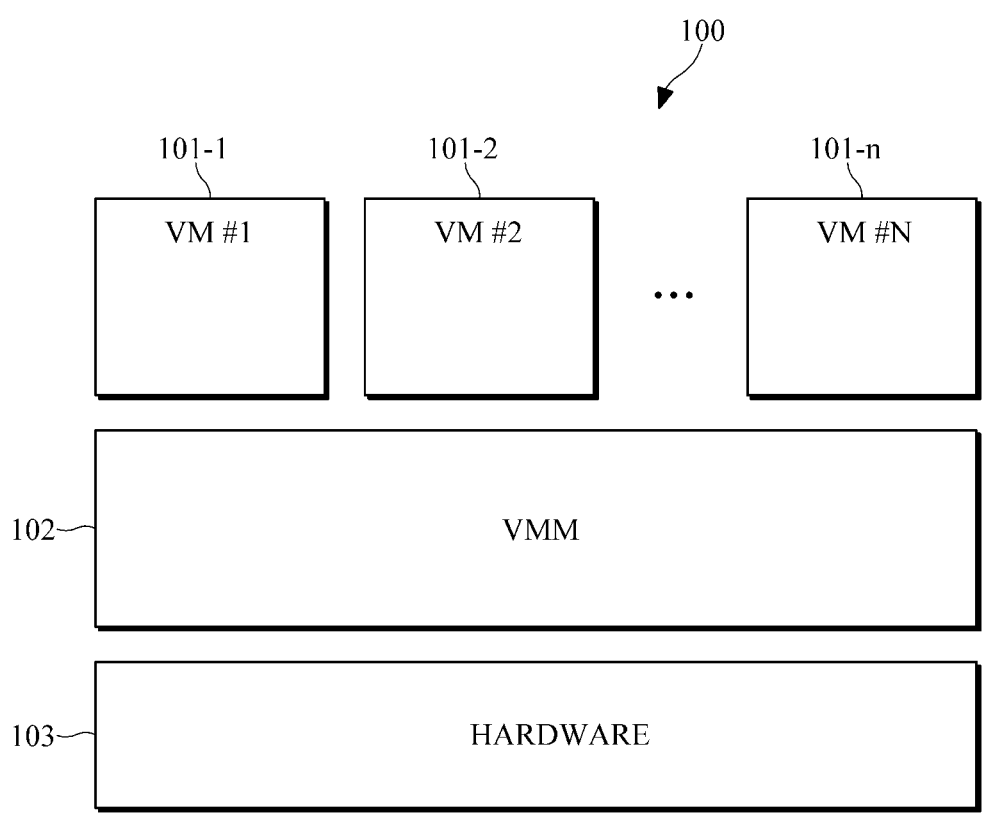
FIG. 1 is a diagram illustrating an example of a virtualization system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein is suggested. Also, descriptions of well-known functions and constructions may be omitted for increased clarity and conciseness.

The methods, apparatuses, and/or systems described herein may be employed in a virtualization environment that includes a virtual machine monitor is provided and that may enable a plurality of virtual machines to be run on a single terminal apparatus. The methods, apparatuses, and/or systems described herein may also be employed in an embedded system virtualization environment that may improve the memory usage rate of a whole system, the performance of such application programs as audio/video (A/V) streaming and communication protocol processing and the user responsiveness of such application programs as graphic user interfaces (GUIs).

FIG. 1 illustrates an example of a virtualization system.

Referring to FIG. 1, virtualization system 100 includes a plurality of virtual machines, for example, VM #1 (101-1), VM #2 (101-2), ..., VM #N (101-n), a virtual machine monitor (VMM) 102, and hardware 103.

VM #1 (101-1) through VM #N (101-n) may be different operating systems (OSs). For example, VM #1 (101-1) may be Windows, and VM #2 (101-2) may be Linux. Different OSs may be run on the same hardware 103 through the VMM 102.

The VMM 102 may provide an execution environment that enables different types of virtual machines, for example, VM #1 (101-1) through VM #N (101-n), to operate on the same hardware 103. For example, the VMM 102 may provide a communication channel through which VM #1 (101-1) through VM #N (101-n) may communicate with each other. The VMM 102 may include a software program such as, for example, Xen, Hypervisor, L4 or the like.

Each of VM #1 (101-1) through VM #N (101-n) may be classified into a control virtual machine or a guest virtual machine. A control virtual machine may be a virtual machine that controls the creation, start, end, and deletion of a guest virtual machine and is generated first by the VMM 102. Some of VM #1 (101-1) through VM #N (101-n) may be determined in the beginning to control virtual machines or guest virtual machines. Control virtual machines may be converted into guest virtual machines and guest virtual machines may be converted into control virtual machines.

Figure 2:
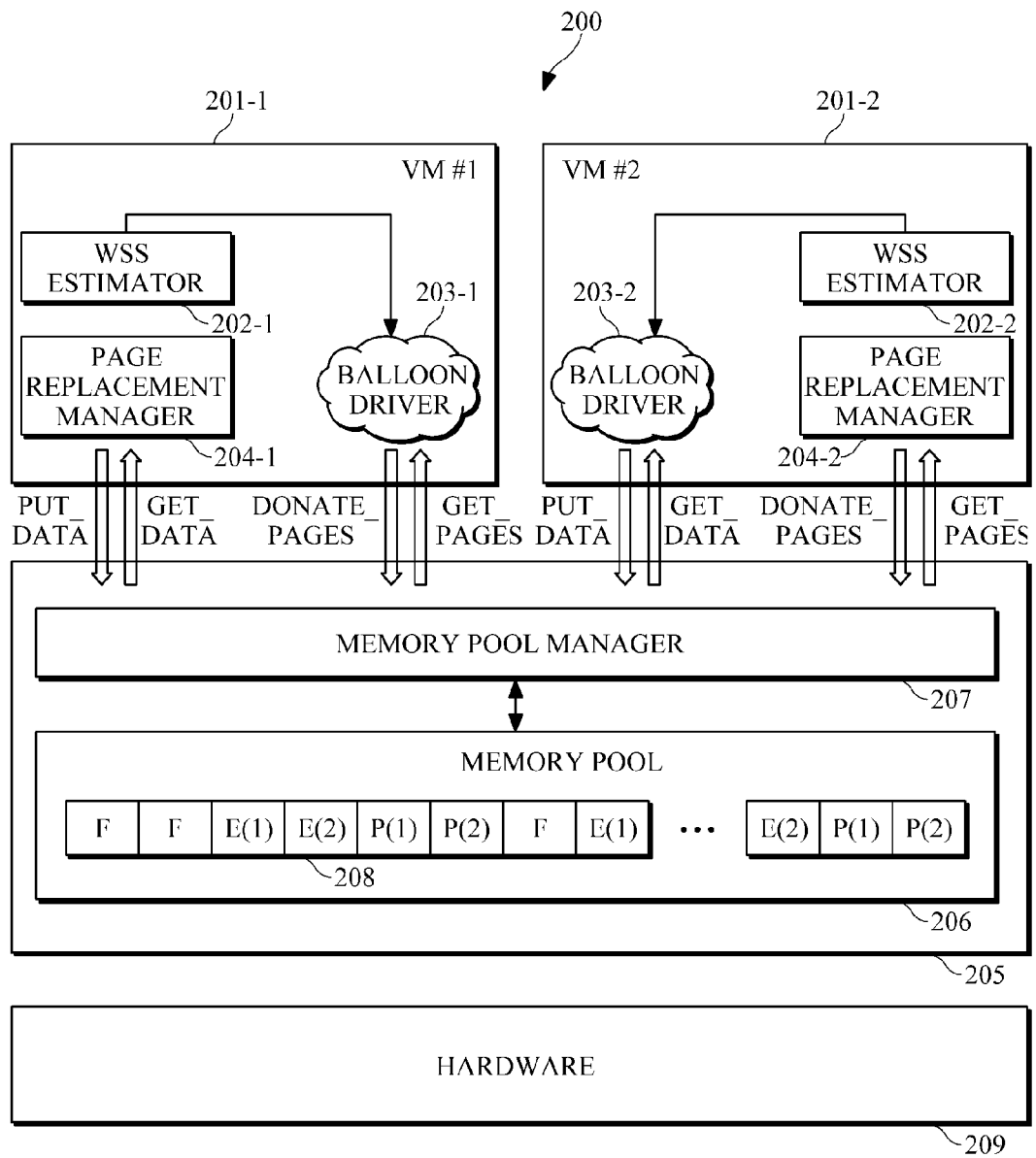
FIG. 2 is a diagram illustrating another example of a virtualization system.

FIG. 2 illustrates another example of a virtualization system.

Referring to FIG. 2, virtualization system 200 may include a plurality of virtual machines, for example, VM #1 (201-1) and VM #2 (201-2), a VMM 205, and hardware 209. VM #1 (201-1) and VM #2 (201-2), the VMM 205, and the hardware 209 correspond with their respective counterparts of FIG. 1.

VM #1 (201-1) and VM #2 (201-2) may include work set size (WSS) estimators 202-1 and 202-2, respectively, balloon drivers 203-1 and 203-2, respectively, and page replacement managers 204-1 and 204-2, respectively. The WSS estimators 202-1 and 202-2 may control the operation of the balloon drivers 203-1 and 203-2 according to the size of resources held by VM #1 (201-1) and VM #2 (201-2), for example, according to a size of a system memory or memory workload allocated to VM #1 (201-1) and VM #2 (201-2), respectively.

The balloon drivers 203-1 and 203-2 manage the memory use of VM #1 (201-1) and VM #2 (201-2) by performing an expansion operation or a contraction operation inside VM #1 (201-1) and VM #2 (201-2). The expansion operation may allow VM #1 (201-1) and VM #2 (201-2) to absorb a system memory and may transmit the system memory absorbed by VM #1 (201-1) and VM #2 (201-2) to a memory pool manager 207 of the VMM 205 (donate_pages). The contraction operation may allow the balloon drivers 203-1 and 203-2 to receive a system memory from the memory pool manager 207 of the VMM 205 and to provide the received system memory to VM #1 (201-1) and VM #2 (201-2) (get_pages). The balloon drivers 203-1 and 203-2 may move part of a system memory allocated to VM #1 (201-1) and VM #2 (201-2) to the system memory allocated to VM #1 (201-1) and VM #2 (201-2).

The term 'system memory' may indicate a physical memory that accounts for part of the hardware 209 and may be accessed by a central processing unit (CPU).

In response to the memory workload of VM #1 (201-1) and VM #2 (201-2) increasing, the page replacement managers 204-1 and 204-2 may transmit a part of system memory data to the memory pool manager 207 of the VMM 205 (put_data). The memory pool manager 207 may store the system memory data provided by the page replacement managers 204-1 and 204-2 in a memory pool 206. In response to the system memory data stored in the memory pool 206 being accessed during the operation of VM #1 (201-1) and VM #2 (201-2), the accessed data may be acquired from the memory pool 206 with the assistance of the memory pool manager 207 (get_data).

The memory pool 206 may be a virtual memory shared between VM #1 (201-1) and VM #2 (201-2). The memory pool 206 may be used for VM #1 (201-1) and VM #2 (201-2) to store part of system memory data. For example, the memory pool 206 may be a secondary cache or a virtual swap device for system memory data.

The memory pool manager 207 manages the memory pool 206. For example, the memory pool manager 207 may define parts of the memory pool 206 in units of pages 208, and may manage the pages 208 by classifying each of the pages 208 as a free page or a used page. The memory pool manager 207 may classify each used page as a persistent-type page or an ephemeral-type page. The memory pool manager 207 may also manage identification information indicating which of VM #1 (201-1) and VM #2 (201-2) has used each used page. Referring to the memory pool 206 illustrated in FIG. 2, reference character 'F' indicates a free page, reference character 'E(x)' indicates an ephemeral-type page used by VM #x, and reference character 'P(x)' indicates a permanent-type page used by VM #x.

The memory pool manager 207 may process a memory allocation request (for example, donate_page) or a data storage request (for example, put_data) regarding the memory pool 206 by each of VM #1 (201-1) and VM #2 (201-2) based on the priority levels of VM #1 (201-1) and VM #2 (201-2), a guaranteed memory size for each of VM #1 (201-1) and VM #2 (201-2), and the size of memory that can be readily allocated to each of VM #1 (201-1) and VM #2 (201-2).

For example, the memory pool manager 207 may allocate any free memory of VM #1 (201-1) and VM #2 (201-2) to the memory pool 206 and may withdraw the memory provided to the memory pool 206 at any time. The memory pool manager 207 may provide the memory pool 206, which is provided by VM #1 (201-1) and VM #2 (201-2), to one of VM #1 (201-1) and VM #2 (201-2) having a higher priority level than the other virtual machine. The priority levels of VM #1 (201-1) and VM #2 (201-2) may be levels of priority related to the use of resources including the hardware 209.

The priority levels of VM #1 (201-1) and VM #2 (201-2) may be set in advance based on the properties of VM #1 (201-1) and VM #2 (201-2), or may be arbitrarily set.

By dynamically adjusting the memory use of VM #1 (201-1) and VM #2 (201-2) in a virtualization environment, an improvement in the memory use rate and performance of VM #1 (201-1) and VM #2 (201-2) is possible.

The operation of the memory pool manager 207 will be described with reference to FIGS. 3A through 4C.

Figure 3A:
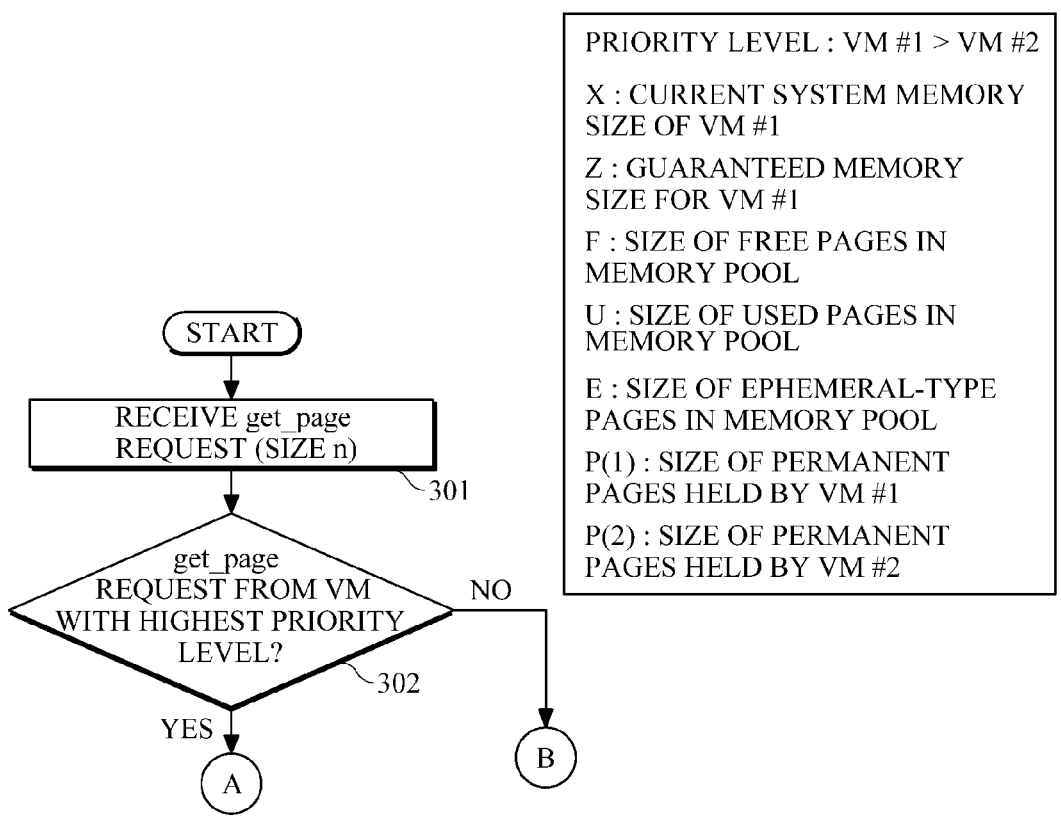
Figure 3B:
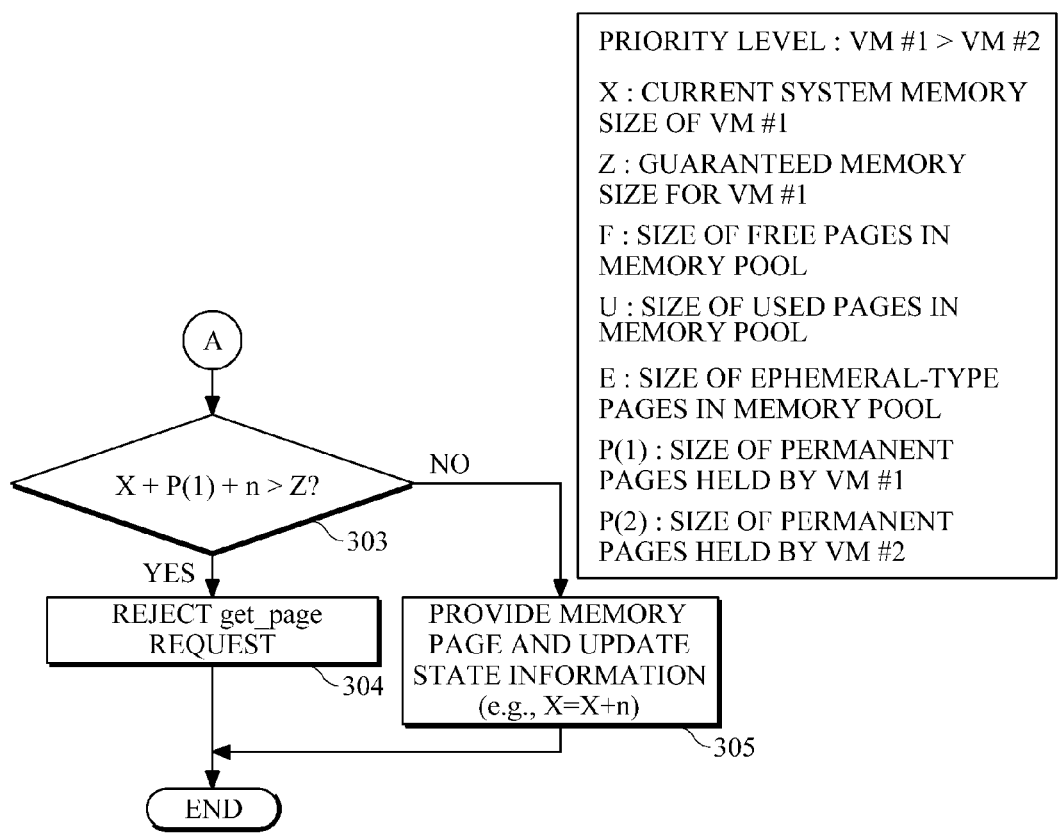

FIGS. 3A through 3C illustrate an example of a memory pool management method performed by a memory pool management apparatus, and an example of an operation of the memory pool manager 207 illustrated in FIG. 2 based on the receipt of a memory allocation request.

Referring to FIGS. 2 and 3A, the memory pool manager 207 may receive a get_page request from VM #1 (201-1) or VM #2 (201-2) (301). The get_page request may be a request for an allocation of a part of the memory pool 206. For example, the memory pool manager 207 may receive the get_page request from the balloon driver 203-1 or 203-2 of VM #1 (201-1) or VM #2 (201-2).

In response to the get_page request being received, the memory pool manager 207 may determine whether the get_page request has been issued by a virtual machine having a highest priority level (302). In response to the get_page request being received from the virtual machine having the highest priority level, the memory pool management method proceeds to A. On the other hand, in response to the get_page request being received from a virtual machine other than the virtual machine having the highest priority level, the memory pool management method proceeds to B.

For example, VM #1 (201-1) may have a higher priority level than VM #2 (201-2). In this example, the memory pool management method may proceed to A in response to the get_page request being received from VM #1 (201-1), and may proceed to B in response to the get_page request being received from VM #2 (201-2).

Referring to FIGS. 2 and 3B, in response to the get_page request being received from VM #1 (201-1), the memory pool manager 207 may provide VM #1 (201-1) with a page (for example, a free page or an ephemeral-type page) of the memory pool 206 to the extent that a guaranteed memory size for VM #1 (201-1) may be secured in the memory pool 206.

For example, the memory pool manager 207 may determine whether [X+P(1)+n]>Z (303) where X indicates a current system memory size of VM #1 (201-1), P(1) indicates the size of persistent-type pages used by VM #1 (201-1), n indicates a memory size or a memory page size requested by VM#1 (201-1), and Z indicates the guaranteed memory size for VM #1 (201-1), which is determined based on the properties of VM #1 (201-1).

In a case in which [X+P(1)+n]>Z, the memory pool manager 207 may reject the get_page request (304). On the other hand, in a case in which [X+P(1)+11]<Z, the memory pool manager 207 may provide a requested page of the memory pool 206 to VM #1 (201-1) and may update state information (305). For example, the memory pool manager 207 may provide a page of the memory pool 206 having the requested size n to VM #1 (201-1), and may update X by adding n to X.

In other words, in operation 303, the memory pool manager 207 may determine whether the guaranteed memory size for VM #1 (201-1) may be secured in the memory pool 206 even after providing a memory page having the requested size n to VM #1 (201-1). Then, the memory pool manager 207 may decide whether to process or reject the get_page request based on the results of the determination.

Referring to FIGS. 2 and 3C, in response to the get_page request being received from VM #2 (201-2), the memory pool manager 207 may provide VM #2 (201-2) with a page (for example, a free page or an ephemeral-type page) of the memory pool 206 up to the size of memory that can be readily allocated to a virtual machine having a higher priority level than VM #2 (201-2), for example, VM #1 (201-1), may be secured in the memory pool 206.

For example, the memory pool manager 207 may determine whether [Z−X-P(1)]<[F+E−n] (306) where Z indicates the guaranteed memory size for VM #1 (201-1), which is determined based on the properties of VM #1 (201-1), X indicates the current system memory size of VM #1 (201-1), P(1) indicates the size of persistent-type pages used by VM #1 (201-1), F indicates the size of free pages in the memory pool 206, E indicates the size of ephemeral-type pages in the memory pool 206, and n indicates a memory size or the memory page size requested by VM #2 (201-2).

In a case in which [Z−X−P(1)]<[F+E−n], the memory pool manager 207 may provide a page of the memory pool 206 having the requested size n to VM #2 (201-2) and may update state information (307). On the other hand, in a case in which [Z−X−P(1)]>[F+E−n], the memory pool manager 207 may reject the get_page request (308).

In other words, in operation 306, the memory pool manager 207 may determine whether the size of memory that can be readily allocated to a virtual machine having a higher priority level than VM #2 (201-2), for example, VM #1 (201-1), may still be secured in the memory pool 206 even after providing a memory page having the requested size n to VM #2 (201-2). Then, the memory pool manager 207 may decide whether to process or reject the get_page request based on the results of the determination.

Figure 4A:
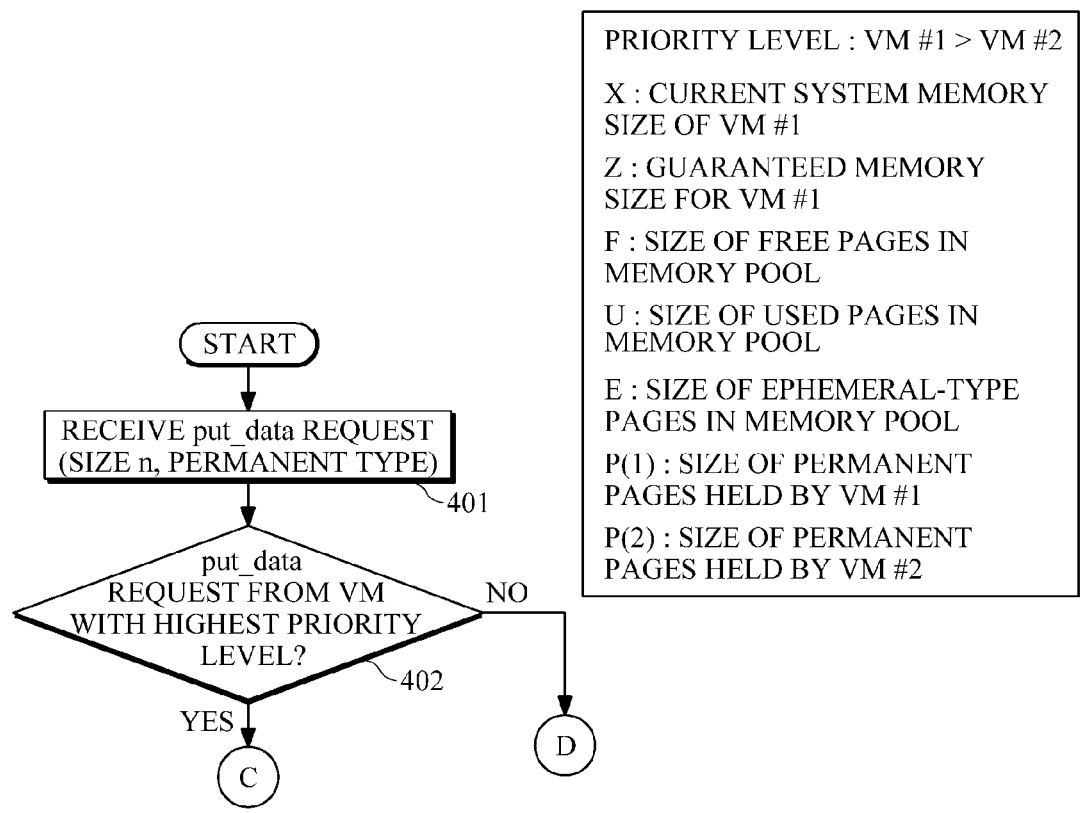
Figure 4B:
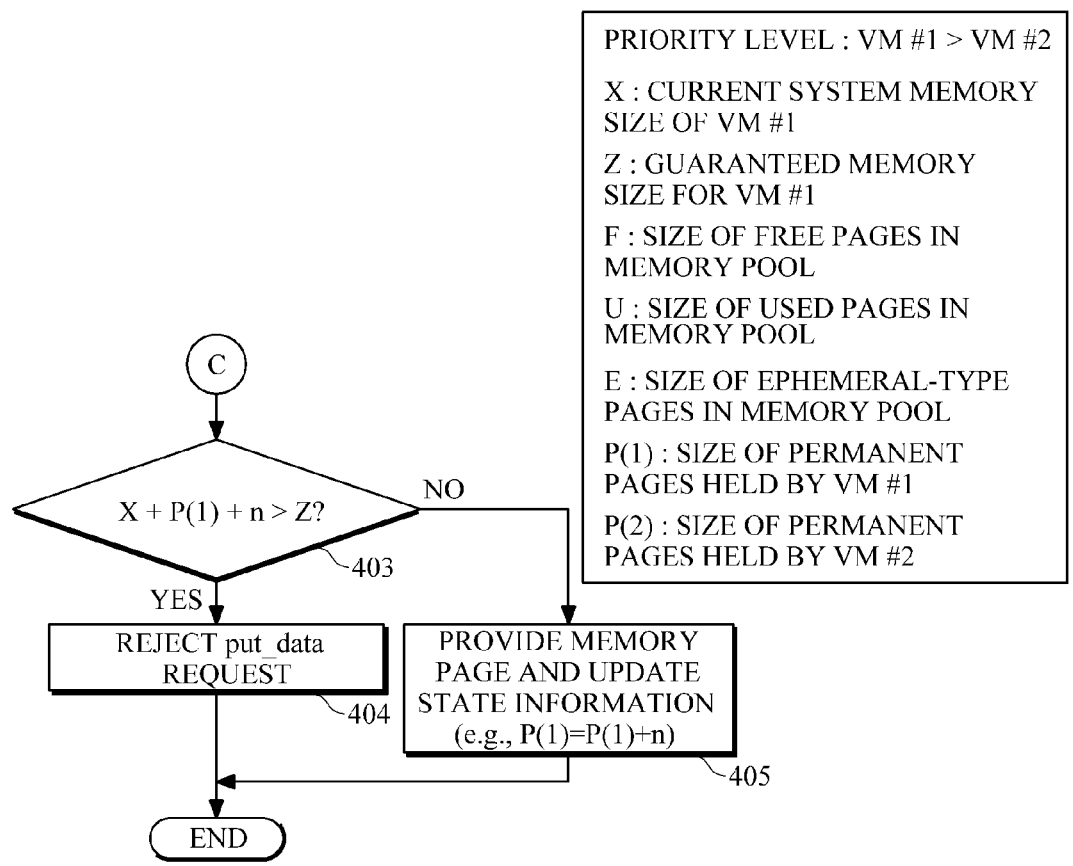

FIGS. 4A through 4C illustrate another example of a memory pool management method performed by a memory pool management apparatus, and an example of an operation of the memory pool manager 207 illustrated in FIG. 2 based on the receipt of a data storage request.

Referring to FIGS. 2 and 4A, the memory pool manager 207 may receive a put_data request from VM #1 (201-1) or VM #2 (201-2) (401). The put_data request may be a request for storing data in the system memory of VM #1 (201-1) or VM #2 (201-2) in the memory pool 206. For example, the memory pool manager 207 may receive the put_data request from the page replacement manager 204-1 or 204-2 of VM #1 (201-1) or VM #2 (201-2). The put_data request may cause a permanent-type page to be generated.

Referring to FIGS. 2 and 4A, the memory pool manager 207 may determine whether the put_data request has been issued by a virtual machine having a highest priority level (402). In response to the put_data request being received from the virtual machine having the highest priority level, the memory pool management method proceeds to C. On the other hand, in response to the put_data request being received from a virtual machine other than the virtual machine having the highest priority level, the memory pool management method proceeds to D.

For example, VM #1 (201-1) may have a higher priority level than VM #2 (201-2). In this example, the memory pool management method may proceed to C in response to the put_data request being received from VM #1 (201-1), and may proceed to D in response to the put_data request being received from VM #2 (201-2).

Referring to FIGS. 2 and 4B, in response to the put_data request being received from VM #1 (201-1), the memory pool manager 207 may store data in VM #1 (201-1) in the memory pool 206 up to a guaranteed memory size for VM #1 (201-1) may be secured in the memory pool 206.

For example, the memory pool manager 207 may determine whether [X+P(1)+n]>Z (403) where X indicates a current system memory size of VM #1 (201-1), P(1) indicates the size of persistent-type pages used by VM #1 (201-1), n indicates the size of data of VM #1 (201-1) to be stored in the memory pool 206, and Z indicates the guaranteed memory size for VM #1 (201-1), which is determined based on the properties of VM #1 (201-1).

In a case in which [X+P(1)+n]>Z, the memory pool manager 207 may reject the put_data request (404). On the other hand, in a case in which [X+P(1)+n]≤Z, the memory pool manager 207 may store data in VM #1 (201-1) in the memory pool 206 and may update state information (405). For example, the memory pool manager 207 may store VM #1 (201-1)'s data having the size n in the memory pool 206, and may update P(1) by adding n to P(1).

In other words, in operation 403, the memory pool manager 207 may determine whether the guaranteed memory size Z for VM #1 (201-1) may still be secured after storing the data of VM #1 (201-1) in the memory pool 206. Then, the memory pool manager 207 may decide whether to process or reject the put_data request based on the results of the determination.

Referring to FIGS. 2 and 4C, in response to the put_data request being received from VM #2 (201-2), the memory pool manager 207 may store data in VM #2 (201-2) in the memory pool 206 up to the size of memory that may be readily allocated to a virtual machine having a higher priority level than VM #2 (201-2), for example, VM #1 (201-1), may be secured in the memory pool 206.

For example, the memory pool manager 207 may determine whether [Z−X−P(1)]<[F+E−n] (406) where Z indicates the guaranteed memory size for VM #1 (201-1), which is determined based on the properties of VM #1 (201-1), X indicates the current system memory size of VM #1 (201-1), P(1) indicates the size of persistent-type pages used by VM #1 (201-1), F indicates the size of free pages in the memory pool 206, E indicates the size of ephemeral-type pages in the memory pool 206, and n indicates the size of data of VM #2 (201-2) to be stored in the memory pool 206.

In a case in which [Z−X−P(1)]<[F+E−n], the memory pool manager 207 may store VM #2 (201-2)'s data having the size n in the memory pool 206, and may update state information (407). On the other hand, in a case in which $[Z-X-P(1)] \geq [F+E-n]$, the memory pool manager 207 may reject the put_data request (408).

In other words, in operation 406, the memory pool manager 207 may determine whether the size of memory that may be readily allocated to a virtual machine having a higher priority level than VM #2 (201-2), for example, VM #1 (201-1), may still be secured in the memory pool 206 even after storing VM #2 (201-2)'s data having the size n in the memory pool 206. Then, the memory pool manager 207 may decide whether to process or reject the put_data request based on the results of the determination.

As described above, adjusting the memory usage of each virtual machine according to the memory workload of each virtual machine by managing the amount of memory allocated to each virtual machine through a memory pool shared between multiple virtual machines is possible. In addition, improving the performance of the management of resources by maintaining the guaranteed memory size for each virtual machine or the amount of memory that can be allocated to each virtual machine in consideration of the priority level of each virtual machine in terms of the use of resources is possible.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable recording mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A virtualization apparatus, comprising:
a plurality of virtual machines configured to have priority levels;
a memory pool configured to be shared between the plurality of virtual machines and store part of data stored in a system memory of each of the plurality of virtual machines; and
a memory pool manager configured to process a memory allocation request or a data storage request regarding the memory pool in consideration of the priority levels of the plurality of virtual machines, a guaranteed memory size for each of the plurality of virtual machines, and a size of memory that can be allocated to each of the plurality of virtual machines,
wherein the memory pool comprises a plurality of pages, and
the memory pool manager classifies the plurality of pages into free pages and used pages, classifies the used pages into ephermeral-type pages and persisitent-type pages, and processes the memory allocation request or the data storage request based on the free pages and the ephermeral-type pages.

2. The virtualization apparatus of claim 1, wherein the memory pool manager receives the memory allocation request from a first virtual machine, which is one of the plurality of virtual machines, determines whether the first virtual machine is a virtual machine with a highest priority level, and in response to the first virtual machine being the virtual machine with the highest priority level, provides a page of the memory pool to an extent that the guaranteed memory size for the first virtual machine can be secured.

3. The virtualization apparatus of claim 2, wherein in response to the first virtual machine not being the virtual machine with the highest priority level, the memory pool manager provides a page of the memory pool to an extent that a size of memory that can be readily allocated to each virtual machine having a higher priority level than the first virtual machine can be secured.

4. The virtualization apparatus of claim 1, wherein in response to the data storage request being received from a second virtual machine, which is one of the plurality of virtual machines, the memory pool manager determines whether the second virtual machine is a virtual machine with a highest priority level, and, in response to the second virtual machine being the virtual machine with the highest priority level, the memory pool manager stores data in the memory pool to an extent that the guaranteed memory size for the second virtual machine can be secured.

5. The virtualization apparatus of claim 4, wherein in response to the second virtual machine not being the virtual machine with the highest priority level, the memory pool manager stores data in the memory pool to an extent that a size of memory that can be readily allocated to each virtual machine having a higher priority level than the second virtual machine can be secured.

6. The virtualization apparatus of claim 1, wherein the size of memory that can be readily allocated to each of the plurality of virtual machines is defined by subtracting a sum of a current system memory size of a corresponding virtual machine and a size of ephemeral-type pages used by the corresponding virtual machine from a guaranteed memory size for the corresponding virtual machine.

7. A memory pool management apparatus for use in a virtualization environment, the memory pool management apparatus comprising:

a reception unit configured to receive a memory allocation request regarding a memory pool, which stores part of data stored in a system memory of each of a plurality of virtual machines having priority levels, from a first virtual machine, which is one of the plurality of virtual machines; and a processing unit configured to determine whether the first virtual machine is a virtual machine with a highest priority level and, in response to the first virtual machine being the virtual machine with the highest priority level, provide a page of the memory pool to an extent that a guaranteed memory size for the first virtual machine can be secured, and, in response to the first virtual machine not being the virtual machine with the highest priority level, provide a page of the memory pool to an extent that a size of memory that can be readily allocated to each virtual machine having a higher priority level than the first virtual machine can be secured.

8. A memory pool management apparatus for use in a virtualization environment, the memory pool management apparatus comprising:

a reception unit configured to receive a memory storage request regarding a memory pool, which stores part of data stored in a system memory of each of a plurality of virtual machines having priority levels, from a second virtual machine, which is one of the plurality of virtual machines; and a processing unit configured to determine whether the second virtual machine is a virtual machine with a highest priority level and, in response to the second virtual machine being the virtual machine with the highest priority level, store data in the memory pool to an extent that a guaranteed memory size for the second virtual machine can be secured, and, in the response to the second virtual machine not being the virtual machine with the highest priority level, store data in the memory pool to an extent that a size of memory that can be readily allocated to each virtual machine having a higher priority level than the second virtual machine can be secured.

9. A memory pool management method for use in a virtual environment, the memory pool management method comprising:

receiving a memory allocation request regarding a memory pool, which stores part of data stored in a system memory of each of a plurality of virtual machines having priority levels, from a first virtual machine, which is one of the plurality of virtual machines; and determining whether the first virtual machine is a virtual machine with a highest priority level and, in response to the first virtual machine being the virtual machine with the highest priority level, providing a page of the memory pool to an extent that a guaranteed memory size for the first virtual machine can be secured, and, in response to the first virtual machine not being the virtual machine with the highest priority level, providing a page of the memory pool to an extent that a size of memory that can be readily allocated to each virtual machine having a higher priority level than the first virtual machine can be secured.

10. A memory pool management method for use in a virtualization environment, the memory pool management method comprising:

receiving a data storage request regarding a memory pool, which stores part of data stored in a system memory of each of a plurality of virtual machines having priority levels, from a first virtual machine, which is one of the plurality of virtual machines; and determining whether the first virtual machine is a virtual machine with a highest priority level and, in response to the first virtual machine being the virtual machine with the highest priority level, storing data in the memory pool to an extent that a guaranteed memory size for the first virtual machine can be secured, and, in response to the first virtual machine not being the virtual machine with the highest priority level, storing data in the memory pool to an extent that a size of memory that can be readily allocated to each virtual machine having a higher priority level than the first virtual machine can be secured.

11. A memory pool management method for use in a virtual environment, the memory pool management method comprising:

receiving a memory allocation request regarding a memory pool, which stores a part of data stored in a system memory of each of a plurality of virtual machines having priority levels, from one of the plurality of virtual machines;

in response to the one virtual machine being the virtual machine with the highest priority level, providing a page of the memory pool to an extent that a guaranteed memory size for the one virtual machine can be secured; and in response to the one virtual machine being the virtual machine with a lower priority than the highest priority level, providing a page of the memory pool to an extent that a size of memory that can be readily allocated to each virtual machine having a higher priority level than the one virtual machine can be secured and rejecting the memory allocation request.

12. The memory pool management method of claim 11, wherein the providing operation includes updating state information of the current system memory.

13. A memory pool management method for use in a virtualization environment, the memory pool management method comprising:

receiving a data storage request regarding a memory pool, which stores a part of data stored in a system memory of each of a plurality of virtual machines having priority levels, from one of the plurality of virtual machine;

in response to the one virtual machine being the virtual machine with the highest priority level, storing data in the memory pool to an extent that a guaranteed memory size for the one virtual machine can be secured; and in response to the one virtual machine being the virtual machine with a lower priority than the highest priority level, storing data in the memory pool to an extent that a size of memory that can be readily allocated to each virtual machine having a higher priority level than the one virtual machine can be secured and rejecting the data storage request.

14. The memory pool management method of claim 13, wherein the storing operation includes updating state information of the current system memory.

* * * * *